(12) United States Patent  (10) Patent No.: US 8,637,189 B2
Okabe et al.  (45) Date of Patent: Jan. 28, 2014

(54) BATTERY ELECTRODE SHEET AND MANUFACTURING METHOD THEREFOR

(75) Inventors: Kazuya Okabe, Kyoto (JP); Yoshikatsu Ohtani, Kyoto (JP); Yoshihiro Takaura, Kyoto (JP)

(73) Assignee: GS Yuasa International Ltd., Kyoto-shi, Kyoto (JP)

( * ) Notice: Subject to any disclaimer, the term of this patent is extended or adjusted under 35 U.S.C. 154(b) by 175 days.

(21) Appl. No.: 13/204,549

(22) Filed: Aug. 5, 2011

(65) Prior Publication Data

US 2012/0045689 A1 Feb. 23, 2012

(30) Foreign Application Priority Data

Aug. 18, 2010 (JP) ................................. 2010-182880
Jul. 11, 2011 (JP) ................................. 2011-152818

(51) Int. Cl.
 *H01M 4/70* (2006.01)
(52) U.S. Cl.
 USPC ................................. 429/233; 429/245; 29/2
(58) Field of Classification Search
 USPC ................. 429/233, 235, 236, 237, 245; 29/2
 See application file for complete search history.

(56) References Cited

U.S. PATENT DOCUMENTS

| 5,741,612 | A  | * | 4/1998  | Verhoog et al. ............... 429/235 |
| 6,300,002 | B1 | * | 10/2001 | Webb et al. ..................... 429/94 |
| 7,871,728 | B2 | * | 1/2011  | Minami et al. ............ 429/233 X |
| 7,955,736 | B2 | * | 6/2011  | Cheon et al. .................. 429/233 |
| 2003/0134186 | A1 | | 7/2003 | Shizuki ........................... 429/94 |

FOREIGN PATENT DOCUMENTS

| JP | 58-33666 B    | 7/1983  | ............. H01M 4/26 |
| JP | 5-28990 A     | 2/1993  | ............. H01M 4/30 |
| JP | 11-354103 A   | 12/1999 | ............. H01M 4/02 |
| JP | 2000-208129 A | 7/2000  | ............. H01M 2/26 |
| JP | 2003-100286 A | 4/2003  | ............. H01M 4/04 |
| JP | 2003-217667 A | 7/2003  | ............ H01M 10/40 |
| JP | 2005-93236 A  | 4/2005  | ............. H01M 4/04 |
| JP | 2010-20986 A  | 1/2010  | ............. H01M 4/02 |

* cited by examiner

*Primary Examiner* — Stephen J. Kalafut
(74) *Attorney, Agent, or Firm* — McGinn IP Law Group, PLLC

(57) ABSTRACT

An electrode sheet includes a sheet of metal foil, at least one region coated with at least one active material layer subjected to working by rolling, the at least one coated region being provided in at least one central portion of the sheet of metal foil, at least one region uncoated with the at least one active material layer, the at least one uncoated region being provided in at least one edge portion of the sheet of metal foil, and at least one region subjected to working by drawing, the at least one drawn region being provided in at least a portion of the at least one uncoated region.

17 Claims, 11 Drawing Sheets

BATTERY ELECTRODE SHEET AND MANUFACTURING METHOD THEREFOR

FIELD OF INVENTION

The present invention relates to a battery electrode sheet and to a manufacturing method therefor.

BACKGROUND

Figure 9:
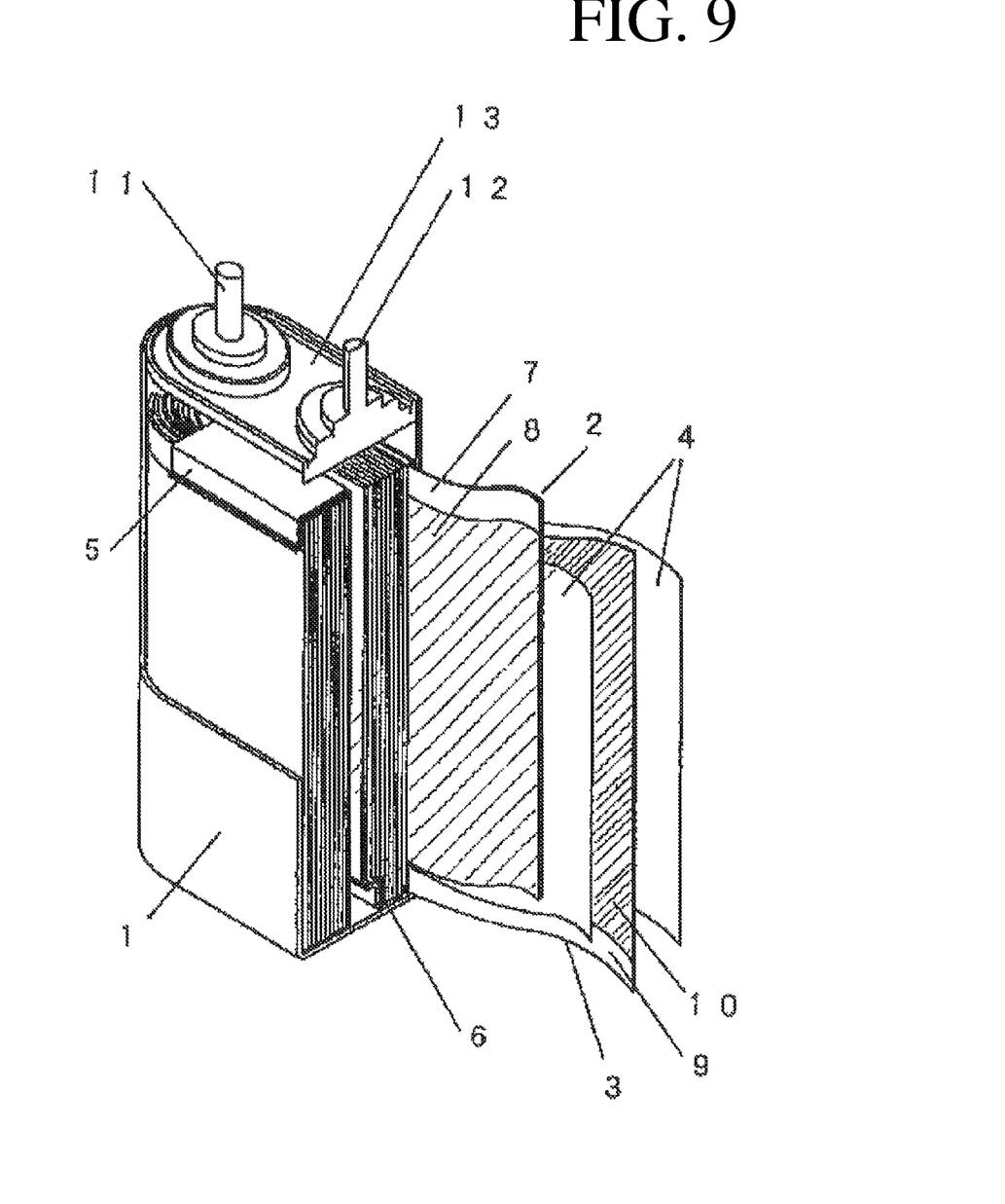
FIG. 9 is a drawing showing exemplary structure in a conventional spiral wound battery.

FIG. 9 is a drawing showing an example of the structure of a conventional spiral wound battery (Patent Referenfoc No. 1). As shown in the drawing, a spiral wound battery typically comprises a sheet-like cathode on which cathode active material (cathode compound layer 8) is formed, a separator 4, and a sheet-like anode on which anode active material (anode compound layer 10) is formed. Furthermore, these are respectively wound in layered fashion such that uncoated regions (regions 7, 9 uncoated with compound layer) at mutually opposite edge portions of the anode and the cathode extend beyond the separator when housed within the battery casing. Uncoated regions 7, 9 at which active material (cathode compound layer or anode compound layer) is not present are provided at these edge portions of the electrodes, current collector 5, 6 being connected by welding or the like to these uncoated regions 7, 9 so as to permit connection to the respective terminals of the battery casing.

Although the spiral wound battery shown in the example of the drawing has a flattened profile, the electrodes thereof being wound in substantially planar fashion, batteries of the cylindrical type (Patent Reference No. 2), which are wound in substantially cylindrical fashion, employ more or less the same basic structure and manufacturing method, these two types of battery differing only with respect to the fact that differently shaped mandrels are employed during winding of the electrodes.

REFERENCES

Patent References

Patent Reference No. 1: Japanese Patent Application Publication Kokai No. 2003-217667
Patent Reference No. 2: Japanese Patent Application Publication Kokoku No. S58[1983]-33666
Patent Reference No. 3: Japanese Patent Application Publication Kokai No. H11[1999]-354103

Problem to be Solved

An electrode sheet is typically produced by applying active material to the surface of a sheet of thin metal foil (film), and subjecting this to an operation in which pressure is applied from above by means of a press or the like. One manufacturing-related problem that can occur with an electrode sheet obtained in accordance with such a manufacturing method is that the electrode sheet may exhibit curl. This curling is primarily observed under conditions where no tension is applied the electrode sheet, curling tending not to be observed, for example, if the electrode sheet is kept continuously in tension.

But when tension is no longer applied, such as may happen when equipment stops operating, the problem of curling can occur. If an electrode sheet exhibiting curl is attempted to be wound, this tends to cause such problems as skewed takeup. What normally happens when manufacturing electrodes for a spiral wound battery is that a roll press is used to subject the active material layer at both the cathode and the anode to working by rolling, and this is thereafter sent to a winding machine, where winding is carried out so as to cause the cathode and anode sheets to be stacked together with the separator inserted therebetween. But if the electrode sheet is inserted in the winding machine while still exhibiting curl, this makes it impossible to ensure positional accuracy, as the distortion and bending that take place during insertion will make it impossible to carry out proper winding.

Upon careful observation of electrode sheets exhibiting curl it is found that curling occurs due to the difference in lengths between the region that is coated with active material layer and the region that is uncoated therewith which exists at the edge portion of the electrode sheet. This is thought to be due to the different elongations produced at coated regions versus uncoated regions, since, at both the cathode and the anode, uncoated regions are not subjected to working by rolling when the press is used to subject the active material layer to working by rolling (drawing). In tests carried out by the present inventors and taking starting length to be 100.000% prior to working by rolling of the active material layer, elongation of coated regions was found to be 100.346%, while elongation of uncoated regions was found to be 100.031%.

While one might consider also subjecting uncoated regions to working by rolling as one strategy to address this, indiscriminately subjecting uncoated regions to working by rolling causes problems in that the resulting misalignment which occurs at the time that working by rolling is carried out makes it impossible to subject prescribed locations to working by the press. Conversely, employment of a small load during working by the press not only results in occurrence of wrinkling and/or tearing, particularly in the long direction of the uncoated region on the electrode sheet, but also fails to reduce curl magnitude. Furthermore, to simultaneously subject coated and uncoated regions to working by rolling, since it is necessary to impart the roller surface at the press with a relieved region to accommodate the fact that the electrode will be subjected to working by the press, where electrodes having different thicknesses are to be subjected to working by a press it had been necessary to fabricate rollers having relieved regions accommodating those differing thicknesses.

Furthermore, while one might consider such methods as providing slits in intermittent fashion within the uncoated region as described at Patent Reference No. 3, doing so causes occurrences of problems such as decrease in the tensile strength of the electrode sheet. Furthermore, when employing the ordinary sort of takeup in which takeup occurs with application of some fixed amount of tension, the electrode sheet is subjected to working by rolling in continuous and high-speed fashion while this large takeup tension acting in the travel direction of the electrode sheet is applied thereto. When a large load is applied to the coated region and the magnitude of curl is large, this tends to cause occurrence of wrinkling and/or tearing due to distortion of the electrode. Where the magnitude of the curl at the electrode sheet is large as has been described, it will be necessary to frequently stop manufacturing operations, and for human intervention to become necessary to correct various problematic situations.

The present invention was conceived in light of such situation, it being an object thereof to provide such things as a battery electrode sheet having little curl and a manufacturing method therefor.

SUMMARY

One embodiment of the present invention comprises:
at least one sheet-like metal thin film provided on at least a surface of the electrode sheet;
at least one region coated with at least one active material layer subjected to working by rolling, the at least one coated region being provided in at least one central portion of the electrode sheet;
at least one region uncoated with the at least one active material layer, the at least one uncoated region being provided in at least one edge portion of the electrode sheet; and
at least one region subjected to working by drawing, the at least one drawn region being provided in at least a portion of the at least one uncoated region.

Another embodiment of the present invention is an electrode sheet manufacturing method, the method comprising:
preparing an electrode sheet having
  at least one region coated with at least one active material layer, the at least one coated region being created in at least one central portion of the electrode sheet, and
  at least one region uncoated with the at least one active material, the uncoated region being created in at least one edge portion of the electrode sheet;
subjecting a portion of the at least one uncoated region to working by a press so as to create at least one drawn region; and
subjecting the at least one coated region to working by rolling.

At the foregoing manufacturing method, working by rolling of coated region(s) may be carried out before or after creation of drawn region(s) in uncoated region(s).

In accordance with the present invention, because creation of drawn region(s) in region(s) uncoated with active material layer(s) makes it possible to alleviate strain, it is possible to obtain electrode sheet having little curl. For this reason, benefits are also displayed when tension is applied to carry out winding of the electrode sheet and/or when the electrode sheet is transported to subsequent operation(s), in that there is reduced likelihood of occurrence of wrinkling and/or tearing, particularly in the long direction of the electrode sheet. One reason for this is that drawn region(s) make it possible for tension to propagate in the direction perpendicular to the long direction of the electrode sheet, distributing forces that might otherwise cause occurrence of wrinkling. It is thought that the mechanism responsible for occurrence of wrinkling, particularly in the long direction of the electrode sheet, is that this is due to existence of the hardly insignificant locations that escape working by the press when the uncoated region(s) is or are subjected to working by a press. This understanding, first discovered by the present inventors, was an unexpected effect.

Furthermore, with regard to a manufacturing method therefor, because this can, for example, be incorporated into existing tension-controlled press systems and the like, there is the advantage that high-speed manufacture is made possible without dramatic increase in the number of manufacturing operations.

BRIEF DESCRIPTION OF DRAWINGS

FIG. 2 is a drawings showing constitution of (a) an apparatus for manufacturing an electrode sheet for a spiral wound battery, and (b) an intermittent roll press 21.

FIG. 4 is a drawings showing (a) shape of compression regions (more or less rectangular), and (b) shape of compression regions (more or less trapezoidal).

DETAILED DESCRIPTION

Below, where embodiments of the present invention are described, these should not be interpreted in such manner as to limit the scope of the present invention. In the drawings, note that like components are assigned like reference numerals.

Embodiment 1

Electrode Sheet for Spiral Wound Battery

Figure 1:
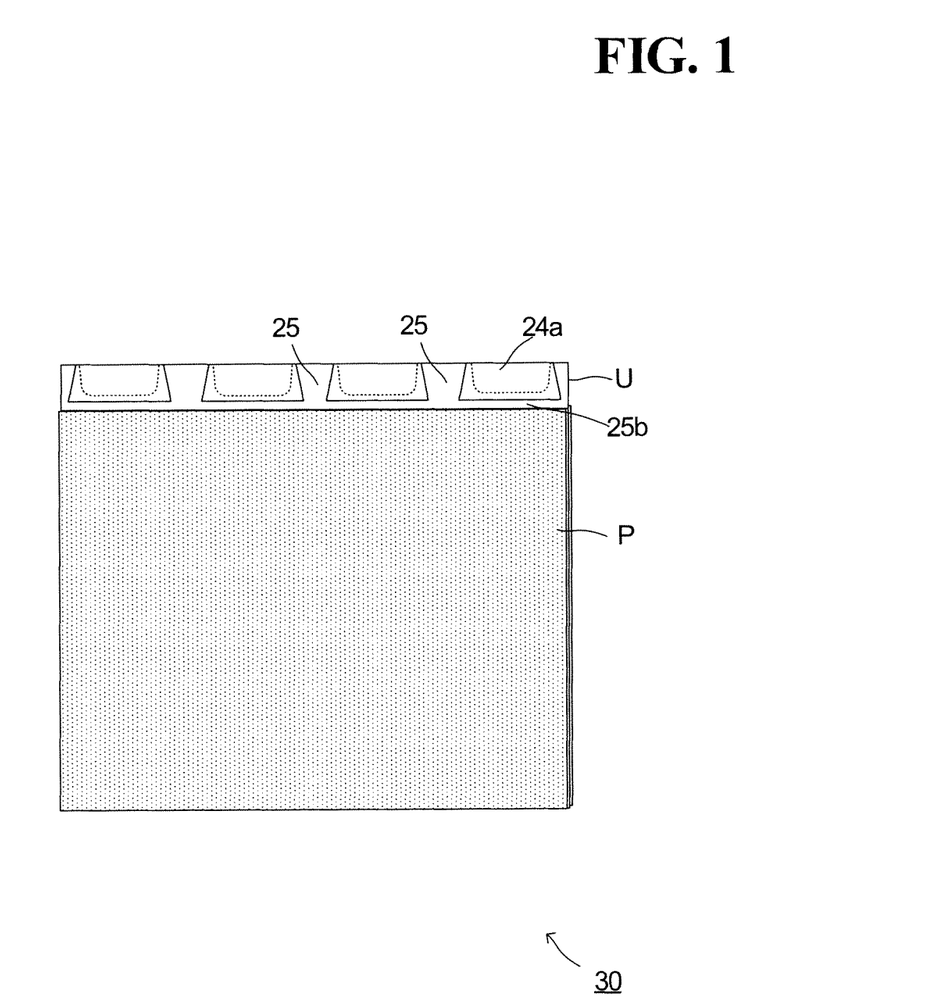
FIG. 1 is a drawing showing the structure of an electrode sheet for a spiral wound battery.

FIG. 1 is a drawing showing the structure of an electrode sheet for a spiral wound battery in accordance with a first embodiment. As shown in the drawing, at electrode sheet 30, active material layer P is present and has been subjected to working by rolling at the entire surface, except for at least one edge portion, of an electrode sheet comprising a sheet of metal foil. In addition, provided in intermittent fashion in the long direction of the electrode sheet at an uncoated region U in this edge portion are more or less rectangular, e.g., more or less trapezoidal, drawn regions 24a. Drawn regions 24a might, for example, be created by an intermittent roll press or the like, described below, and are produced when the metal foil is subjected to working by drawing as a result of compression. Uncoated region U is disposed along the direction in which active material layer P is subjected to working by rolling.

It is sufficient that a sheet-like metal thin film be present on at least a surface of electrode sheet 30. The term "metal thin film" as used herein includes not only metal foil but also, for example, metal-coated resin film or the like. Furthermore, as used herein, the expression "at the entire surface, except for at least one edge portion, of an electrode sheet" means that active material layer(s) subjected to working by rolling is or are present at central portion(s) of the electrode sheet, and that region(s) uncoated with active material layer(s) is or are present at edge portion(s) of the electrode sheet.

Although drawn regions 24a are shown in FIG. 1 as being provided in intermittent fashion, note that these need not be provided in intermittent fashion, it being sufficient that one or more drawn regions 24a be provided in at least a portion of uncoated region U. However, where these are provided in intermittent fashion, this will have the advantage that this facilitates incorporation into a manufacturing system in which transport takes place with application of some fixed amount of tension by means of rollers or the like, and where this is the case, will also have the advantage that if the electrode sheet should become misaligned in a direction other than the electrode sheet transport direction, this can be corrected naturally with application of constant tension during uncompressed state(s).

Note that whereas the example shown in FIG. 1 is such that the shape of the drawn region is an inverted trapezoid as viewed with the side closest to the coated region at the top, any suitable shape may be employed therefor so long as, when the metal foil of the electrode sheet is subjected in advance to partial compression and working by drawing so as to accommodate different elongations at the time of compression, the shape is such as will permit effective accommodation of curl-causing strain. For example, there is no objection to employment of a shape that is rectangular with rounded corners as indicated by the dashed line in FIG. 1. This is so because, since rounding of corners at such rectangular shapes facilitates transmission of tension in directions other than the long direction, and particularly in the direction perpendicular to the long direction, this will permit suppression of wrinkling and tearing that can occur in the long direction when tension is applied, and will also permit suppression of occurrence of wrinkling and tearing or defects near corners. Moreover, note that there is no particular requirement that the respective drawn regions be mutually independent as shown in FIG. 1, there being no objection to situations where, e.g., such as when an entire edge portion is subjected to working by a press, the respective drawn regions are mutually connected in the long direction of edge portion(s) of the electrode sheet.

By thus providing drawn region(s) in partial fashion at region(s) uncoated with active material layer(s), it is possible to reduce the size of the difference in elongations produced at coated region(s) versus uncoated region(s) as a result of compression when active material layer(s) is or are subjected to working by rolling, reducing curl magnitude, and it is possible to prevent occurrence of skewed rolling during continuous compression of uncoated region(s).

Note that as shown in FIG. 1 it is, however, necessary that drawn region(s) be provided at only part(s) of uncoated region(s), and while this is typically done by providing drawn regions in intermittent fashion, the invention is not limited to such embodiments. Furthermore, drawn region(s) may be larger than those shown in FIG. 1. The reason for this is that provision of drawn region(s) in only part(s) of uncoated region(s) results in creation of uncompressed region(s) 25 not subjected to working by drawing at the remaining location(s) thereof, making it possible to achieve effective alleviation of strain by means of the uncompressed region(s) 25. There are any number of ways in which uncompressed region(s) 25 may be created, it being sufficient to arrange drawn regions at prescribed intervals in the long direction of the electrode sheet as described above, and there is also no objection to creation of uncompressed region(s) 25b where drawn region(s) is or are not created in the width direction, i.e., in border region(s) between drawn region(s) and coated region(s).

Moreover, it is sufficient that drawn region(s) be provided on at least only one side of the electrode sheet. This is so because the constitution indicated in the first embodiment permits adequate alleviation of strain and reduction in curl magnitude. It goes without saying that because provision of drawn regions at both sides of the electrode sheet will result in a corresponding increase in portions available for alleviation of strain, this will of course also permit reduction in curl magnitude.

Electrode sheet 30 may be nonporous or porous. Depending on battery type, porous steel plate or similar materials such as those referred to as "perforated metal" may be employed as electrode sheet, in which case it will be necessary to employ compression involving greater forces than would otherwise be required for provision of drawn region(s) in at least a portion of uncoated region(s). This being the case, from the standpoint of facilitating creation of drawn region(s), it is preferred that nonporous metal foil, which is not perforated, be employed as electrode sheet. More specifically, aluminum, copper, and so forth may be cited as examples of materials which may be employed as the electrode sheet.

Where copper foil is employed as substrate material for the anode sheet, thickness thereof is preferably on the order of 7μ to 15μ, and is more preferably 10μ. Where aluminum foil is employed as substrate material for the cathode sheet, thickness thereof is preferably on the order of 10μ to 25μ, and is more preferably 20μ.

While depth of drawn region(s) will vary depending on such things as the thickness of the metal foil employed as substrate material for the electrode sheet, where 10-μ copper foil is, for example, employed as anode sheet, drawn region depth might be 0.03μ, while thickness thereof might be 0.97μ.

With regard to the shape of drawn region(s), while it is thought that some effect is displayed where shape is more or less rectangular, shape may also be more or less trapezoidal; and in particular may be more or less an inverted trapezoid as viewed with the side closest to the coated region at the top, as shown in FIG. 1. The reason for this is that the different elongations at uncoated edge region(s) versus coated edge region(s) (near border region(s) between uncoated region(s) and coated region(s)) cause there to be gradual reduction in the difference in elongations when coated region(s) is or are subjected to working by rolling, reducing the likelihood that wrinkles will be created. Furthermore, there is no objection to creation of uncompressed region(s) 25b, at which drawn region(s) is or are not created, between drawn region(s) and active material layer(s) P.

As described above, creation of drawn regions arranged at certain intervals in uncoated region(s) U of electrode sheet 30 makes it possible to reduce the overall curl magnitude exhibited by the electrode sheet.

Note that while description of the first embodiment was carried out in terms of an example of an electrode sheet for a spiral wound battery, the electrode sheet need not be for a spiral wound battery, it being sufficient that the electrode sheet have uncoated region(s) and that there be a need to subject active material layer(s) to working by rolling. This is so because, since without employment of the present invention there might be a difference in elongations produced by such an electrode sheet, employment of the present invention in such case will make it possible to obtain the benefits of curl prevention and prevention of misalignment during working by a press.

Embodiment 2

Method of Manufacturing Electrode Sheet for Spiral Wound Battery

Next described is an exemplary embodiment of a method for manufacturing the electrode sheet of the first embodiment.

Figure 5:
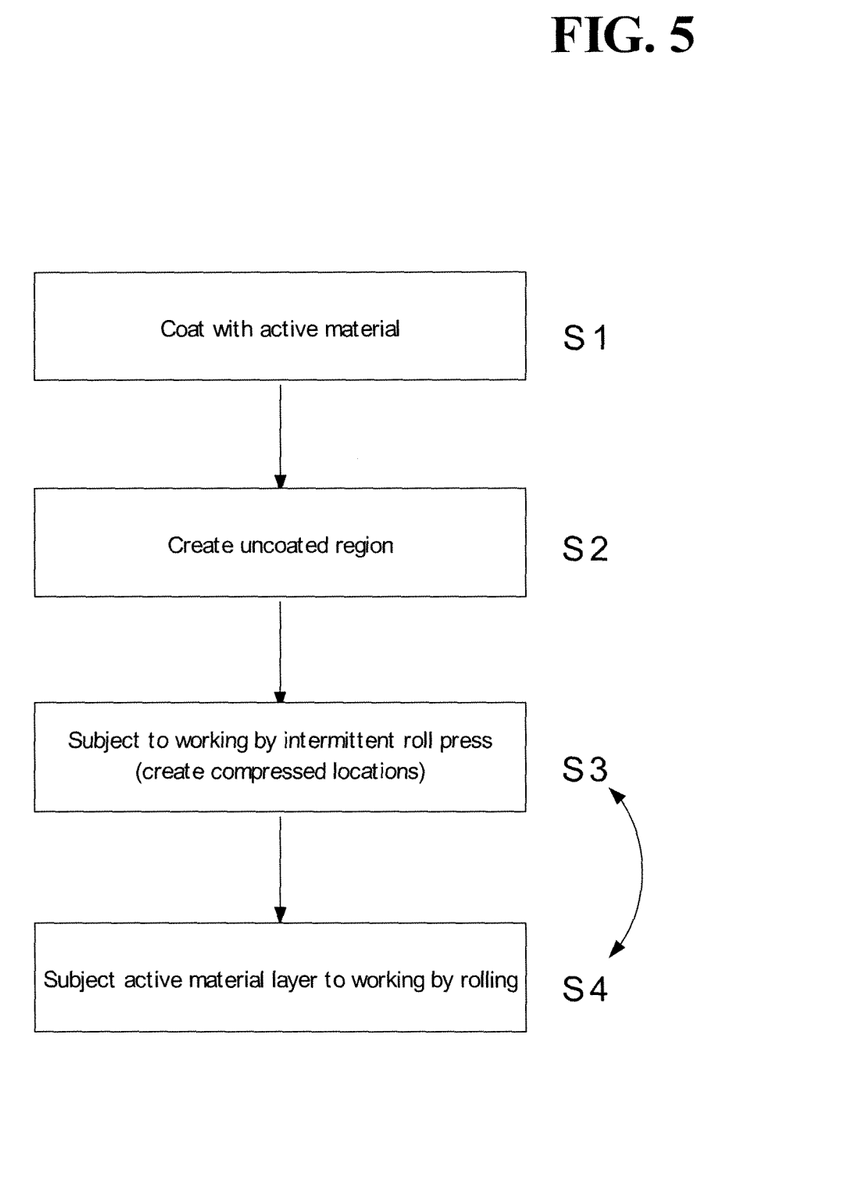
FIG. 5 is a drawing showing a procedure for manufacturing an electrode sheet for a spiral wound battery.

FIG. 5 shows, in broad terms, a procedure for manufacturing an electrode sheet for a spiral wound battery. First, paste-like active material layer is applied to an electrode sheet comprising sheet-like metal foil (step S1). Furthermore, at more or less the same time as step S1, a region uncoated with active material layer is created on the electrode sheet (step S3). In a third step, rectangular drawn regions are created at more or less regular intervals by subjecting the uncoated region to working by a press in intermittent fashion (step S3). Finally, a step S4 is also included in which the active material layer is subjected to working by rolling (step S4).

Note that in the event of employment of a previously prepared electrode sheet on which paste-like active material layer has been applied so as to create coated and uncoated regions, it is also possible to skip steps S1 and S2 and begin at step S3.

Figure 2A:
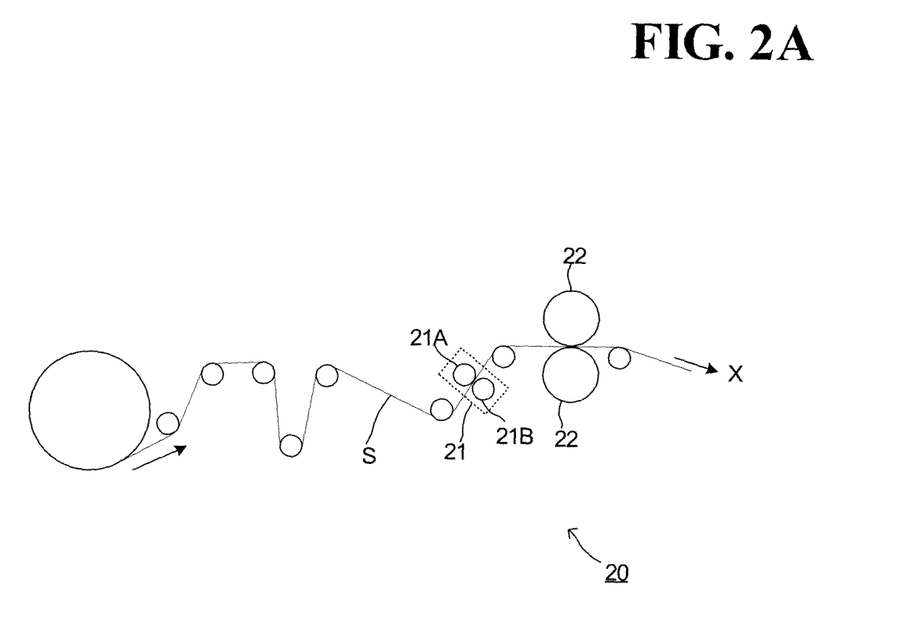

FIG. 2(a) shows a press-type apparatus for manufacturing an electrode sheet for a spiral wound battery. This apparatus is a tension-controlled press system 20 that controls takeup speed by using tension rollers and a load gauge to control the tension that is applied to the electrode sheet. As a prescribed load is applied thereto by tension rollers, sheet-like metal foil S serving as substrate for the electrode sheet is transported in travel direction X from a location at which it is coiled in roll form. Drawn regions (compressed locations) are created in uncoated region U on sheet-like metal foil S as it passes through intermittent roll press 21. Next, this is transported to main roll press 22, where the active material is subjected to working by rolling.

Figure 2B:
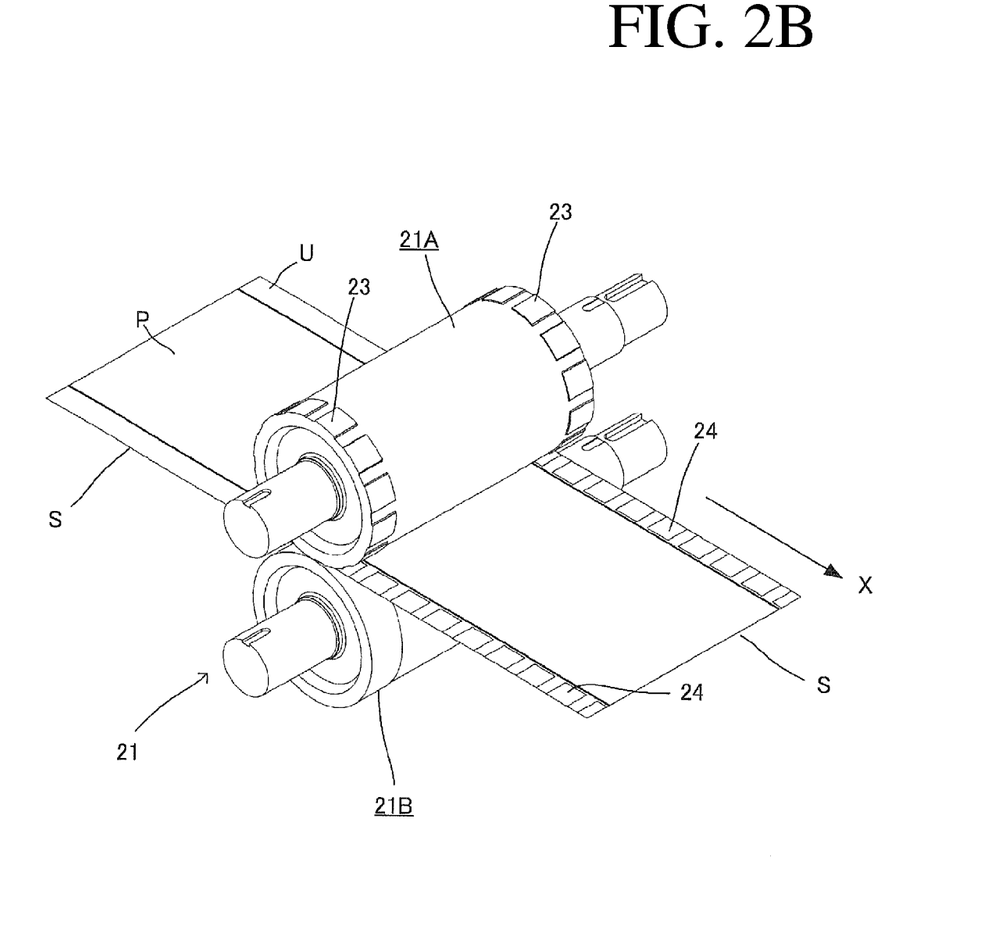

FIG. 2(b) is a drawing showing the constitution of intermittent roll press 21. As shown in the drawing, disposed at regular intervals on embossed roller 21A of intermittent roll press 21 are compression regions 23 for compressing and creating drawn regions at region U which is uncoated with active material layer P. These compression regions 23 are more or less rectangularly shaped embossed regions provided at locations corresponding to either edge portion of the electrode sheet, rotation of backing roller 21B in tandem with embossed roller 21A causing the electrode sheet to be transported in the forward direction. Moreover, as a result of passage of sheet-like metal foil S through intermittent roll press 21, more or less rectangularly shaped drawn regions 24 are created on uncoated region U of sheet-like metal foil S.

Such compression regions for compressing uncoated region(s) on the electrode sheet might, for example, be constituted by an embossed roller which has been provided with embossed regions and a backing roller which cooperates with those embossed regions, drawn regions being created at uncoated region(s) of the electrode sheet as a result of rotation of these rollers. This will make it possible to achieve high-speed processing.

Note that tension rollers, which are ordinarily provided in sets so as to straddle the main roll press 22, have mechanisms for applying prescribed tension to transport the electrode sheet thereto, for stretching thereof, and for takeup thereof.

Typically, where two presses are employed to permit the electrode sheet to be processed in continuous fashion, misalignment of the electrode sheet at the outlet of the first press will result in a problem in which this is fed into the second press while still misaligned (i.e., the problem of skewed rolling occurs). Because the electrode sheet is constantly being subjected to compression by the two presses, this has made it extremely difficult to correct the position or travel direction of the electrode sheet in the transition region between the two presses. However, by causing working by one of the presses to be carried out in intermittent fashion as at the present embodiment, this causes compressed and uncompressed states to come into existence. For this reason, if travel direction X becomes misaligned, it will be possible by applying increased tension to the electrode sheet to cause the direction thereof to be restored to the expected direction during uncompressed states. Accordingly, misalignment of the electrode sheet is easily corrected, permitting improved yield and reduced manufacturing cost as a result.

Figure 3:
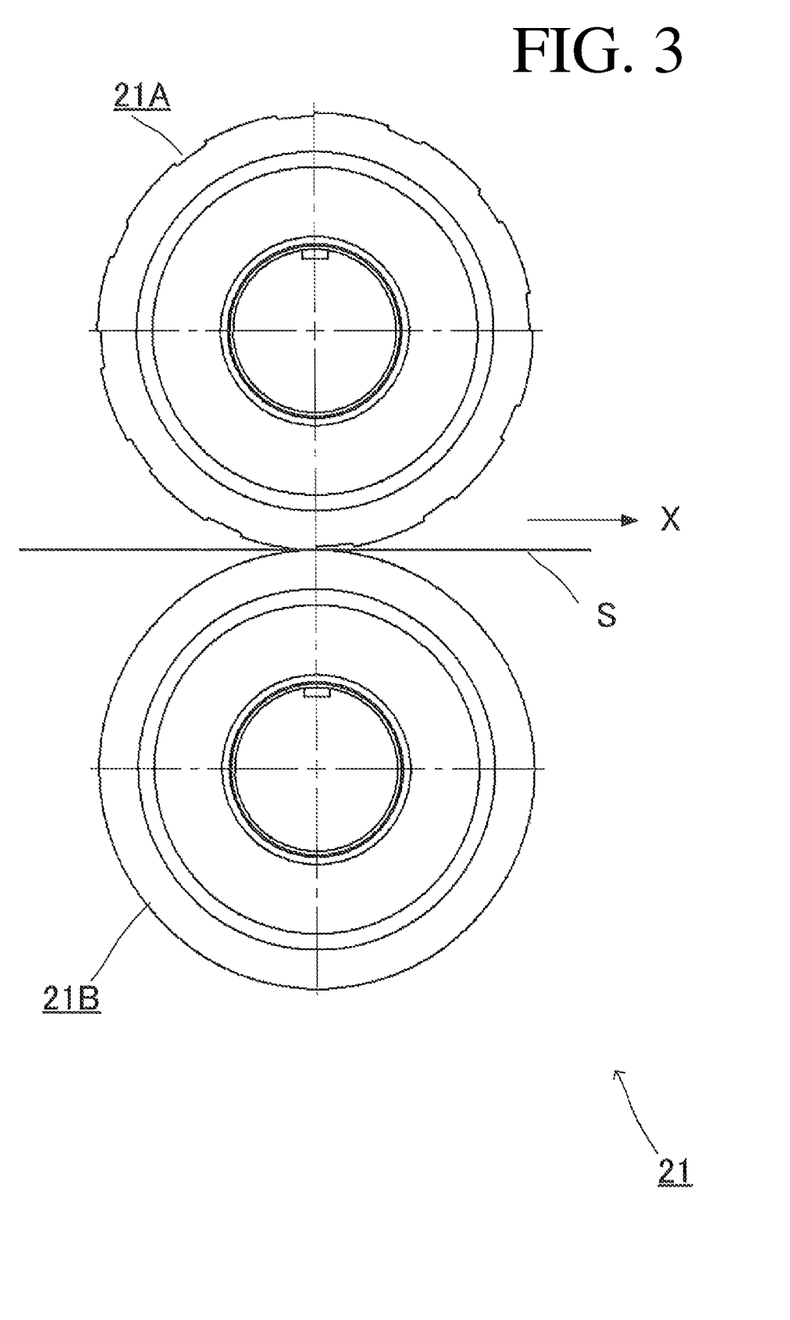
FIG. 3 is an enlarged view showing intermittent roll press 21.

FIG. 3 is an enlarged view showing the constitution of intermittent roll press 21. As shown in the drawing, disposed in opposing fashion at intermittent roll press 21 are embossed roller 21A which is provided with compression regions 23, and backing roller 21B which cooperates therewith.

Moreover, after passing through intermittent roll press 21, sheet-like metal foil S is transported to the main roll press, where active material layer P is subjected to working by rolling. Whereas the difference in elongations at region(s) coated with active material layer versus region(s) uncoated therewith at the time this working by rolling was carried out had conventionally caused occurrence of strain, resulting in curling of the electrode sheet, because intermittent roll press 21 is here employed to provide drawn regions in advance so as to permit accommodation of the difference in elongation, strain is alleviated and curl magnitude is reduced.

After passing through main roll press 22, the electrode sheet is taken up, and is cut in half along the alternating long and short chain line indicated in FIG. 4, and is moreover cut to appropriate dimensions. The electrode sheet that will become the cathode, the electrode sheet that will become the anode, and the separator are each thereafter transported to the winding machine.

Note that the order of steps S3 and S4 may be reversed. Particularly where a takeup step is carried out between the step in which the active material layer is subjected to working by rolling (S4) and the step in which the uncoated region is subjected to working by a press (S3), it is preferred that step S4 be carried out first. The reason for this is that if the step in which the uncoated region is subjected to working by a press is carried out first, this would mean that it will be necessary to carry out takeup of material on which only the uncoated region has been subjected to elongation, which interferes with ability to carry out takeup of the coated region in neat fashion, and which also tend to cause increased bulk (i.e., volume) of the electrode sheet after it has been taken up. Where a takeup step is carried out between step S4 and step S3, this has the advantage that, because processing no longer takes place in continuous fashion, there is no longer a need to interrupt one process to wait for the other or to otherwise match speeds of presses. But because of the disadvantage that this would mean presence of an additional step, it is preferred from the standpoint of reducing lead time that step S3 and step S4 be performed in continuous fashion.

After performing the foregoing steps S1 through S4 to respectively form the cathode sheet and the anode sheet, these are sent to a winding machine, where winding is carried out with the separator inserted therebetween so as to form the battery. Current collectors are respectively formed at the cathode and the anode, the assembly is inserted into a battery housing, and this is then sealed to complete the spiral wound battery. Where a plurality of electrode sheets are manufactured at the same time, it will be necessary to cut the electrode sheet before it is sent to the winding machine.

Figure 4A:
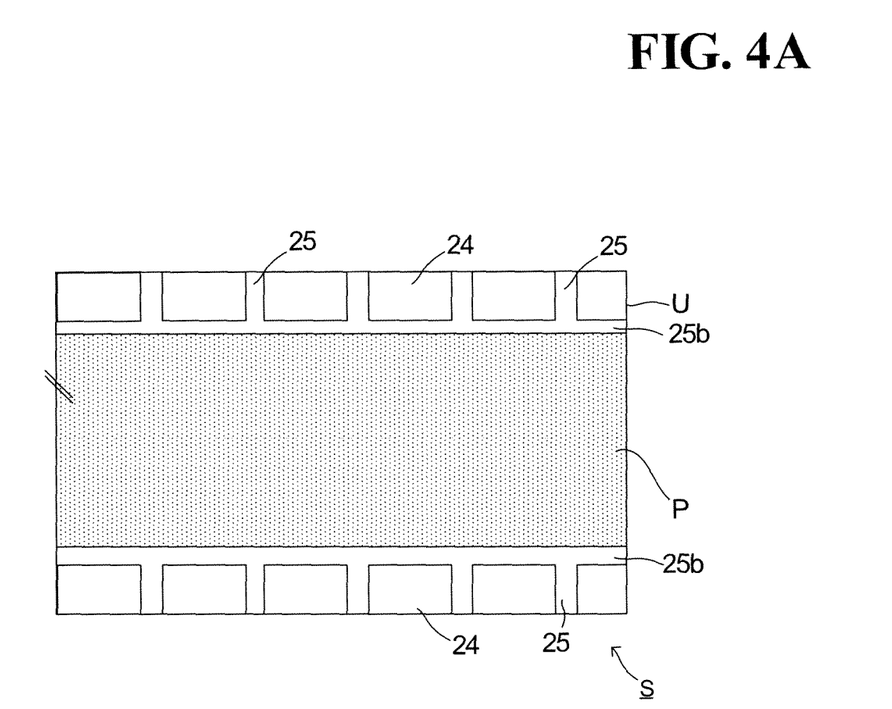
Figure 4B:
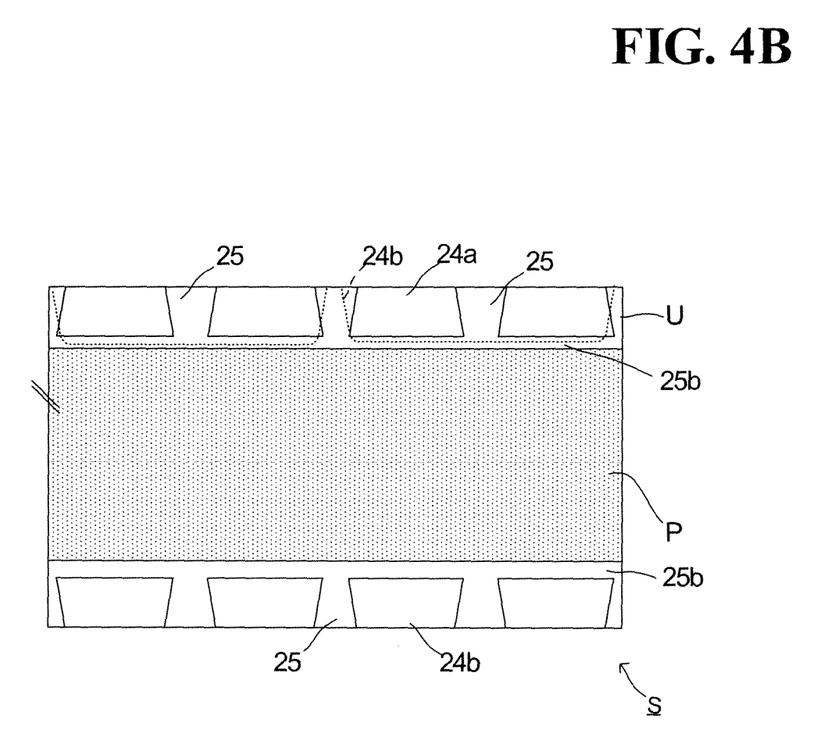

FIG. 4(a) and (b) each show drawn region shape. Shape may be more or less rectangular as shown at FIG. 4(a); or as also shown in the drawing, shape may be more or less trapezoidal, and in particular, shape may be more or less that of an inverted trapezoid as viewed with the side closest to the coated region at the top, as shown at FIG. 4(b). Or, as indicated by the dashed line at FIG. 4(b), shape of drawn regions 24b may be more or less rectangular with rounded corners. Note, moreover, that radius of curvature at corners is not limited to that shown in the drawing. When drawn regions 24a, 24a are provided in intermittent fashion, uncompressed regions 25, which have not been subjected to working by drawing, are created in the space(s) between neighboring drawn regions, the uncompressed regions 25 permitting effective alleviation of strain. Note also that, as has been described above, it is also possible, where convenient depending on manufacturing-related circumstances and so forth, to create uncompressed region(s) 25b in the width direction, i.e., in the space(s) at border region(s) between drawn region(s) and coated region(s) (active material layer P). After the electrode sheet has been taken up, it is cut along the alternating long and short chain line in the drawing, and is cut to appropriate size to complete manufacture of the battery electrode sheet.

Figure 6:
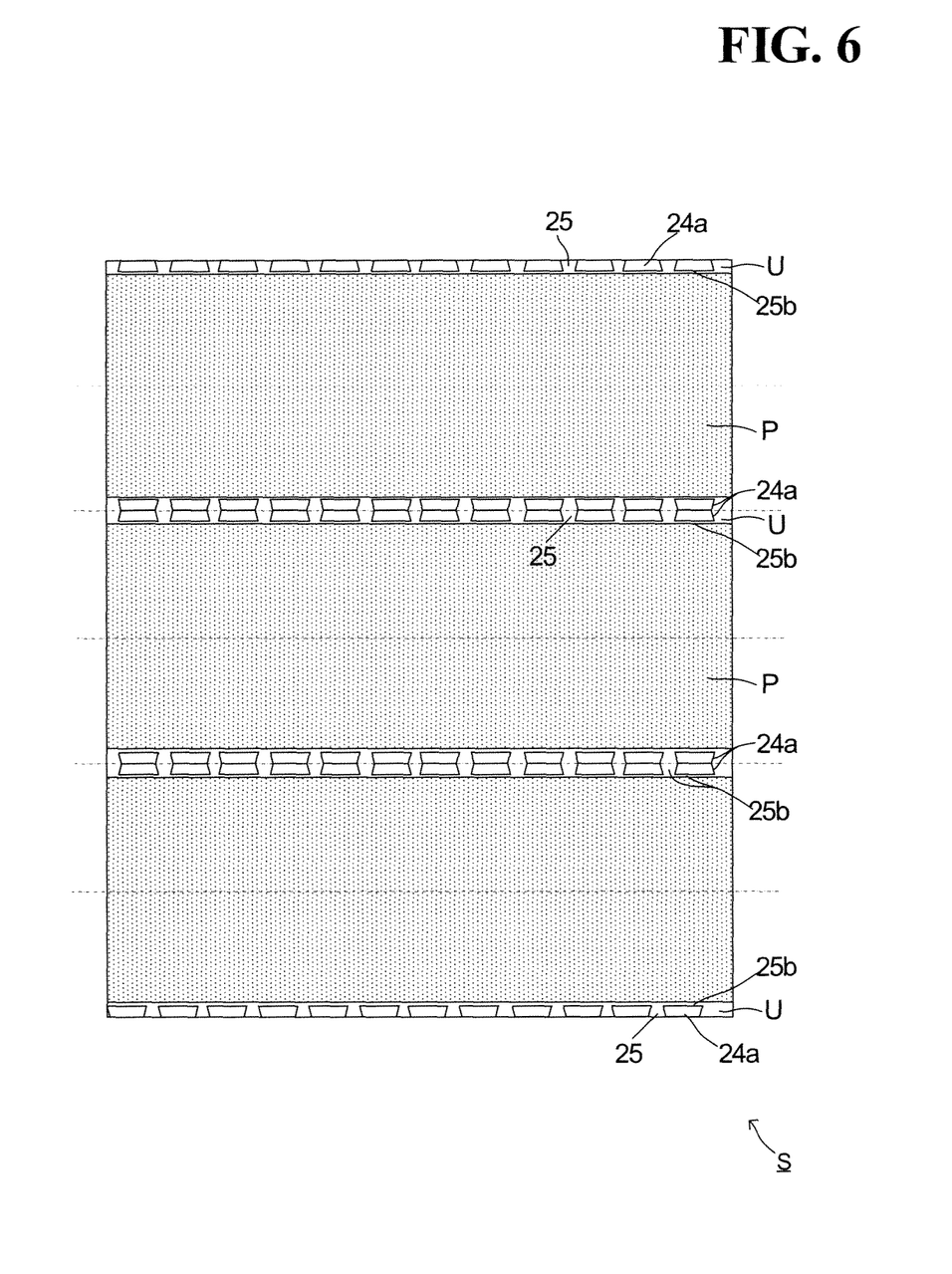
FIG. 6 is a drawing showing an embodiment in which three rows of regions coated with active material layer P are provided on a single sheet of metal foil S.

FIG. 6 shows an embodiment in which three rows of regions coated with active material layer P are provided on a single sheet of metal foil S. After intermittent roll press 21 causes drawn regions 24a having rectangular or trapezoidal shape to be created in intermittent fashion within uncoated regions U, main roll press 22 causes active material layer P to be subjected to working by rolling. Even with an electrode sheet as large in area as this, the drawn regions created by intermittent roll press 21 are able to appropriately alleviate strain and reduce curl magnitude. This permits dramatic improvement in efficiency of manufacturing through mass production.

Working Example(s)

The diameters of the respective rollers at main roll press 22 and intermittent roll press 21 are important for determining the linear loads that will be applied thereby. The present inventors have carried out various studies to investigate the relationship between press linear load and curl magnitude.

Figure 7:
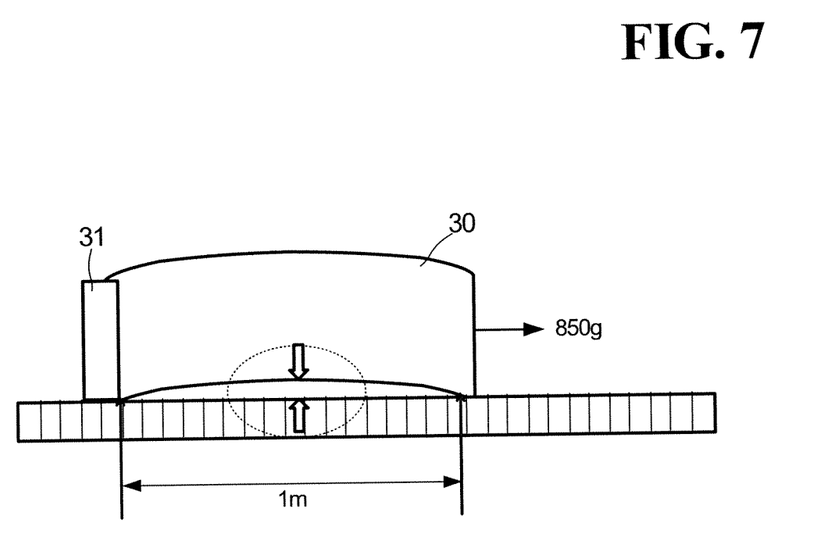
FIG. 7 is a drawing showing a method for measuring curl magnitude.

FIG. 7 is a drawing for describing an exemplary method for measuring curl magnitude. This measurement method shows an electrode sheet 30 that has been cut to prescribed dimensions after active material layer P was subjected to working by rolling. To measure curl magnitude, one edge (side) of electrode sheet 30 is held in place by retaining fixture 31, while a load of 850 g is applied to the other edge (side) thereof by suspending a weight or the like therefrom. With the sheet in this state, a 1 m scale 32 is aligned therewith in such fashion as to cause curl magnitude to be greatest at the central portion thereof as shown in the drawing, and it is the value at this location that is measured as curl magnitude.

While it is in general true of a roll press that the smaller the diameter of the roller the less pressure will be required to create the drawn regions, if diameter is made too small this will result in the problem of inadequate strength at the shaft. In the intermittent roll press 21 used for testing, diameter of embossed roller 21A (FIG. 3) was approximately 120 mm peak-to-peak, and was approximately 118 mm trough-to-trough, this being consistent with the fact that the height of the embossed region corresponding to the compressed region had been set to 1 mm. Furthermore, diameter at the main roll press 22 was 300 mm, and nip pressure was 800 kgf/cm².

Figure 8:
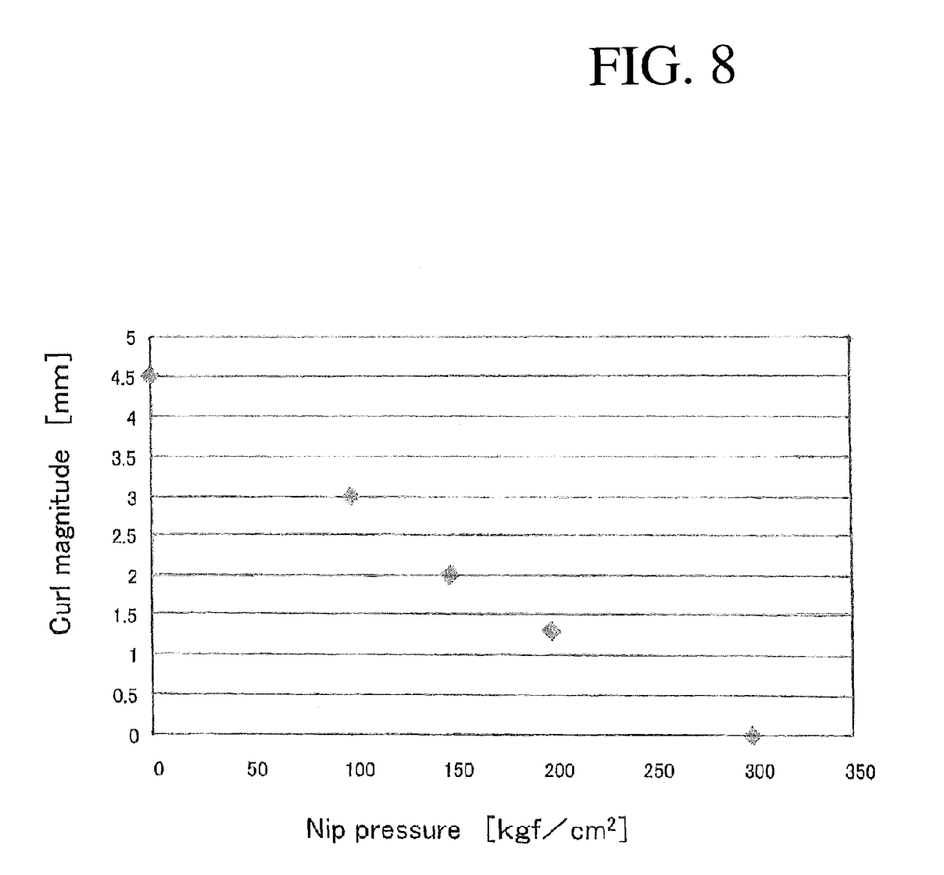
FIG. 8 is a drawing showing relationship between linear load at intermittent roll press and curl magnitude.

FIG. 8 is a drawing showing relationship between linear load at the intermittent roll press and curl magnitude. This study explores the relationship between linear load applied at the intermittent roll press, and the resulting curl magnitude in the electrode sheet 30 obtained, when nip pressure at the main roll press was 800 kgf/cm². As a result it was found that whereas curl magnitude was 4.5 mm when no drawn region was provided, curl magnitude declined in more or less linear fashion as linear load was increased, and a curl magnitude of 0 mm was obtained when nip pressure was 300 kgf/cm², at which time uncoated region elongation was 0.31% of uncoated region width. Moreover, wrinkling at uncoated regions, which had until then been apparent to the naked eye, was not observed on electrode sheet having zero curl magnitude of. For this study, the shape of the compression region produced by the intermittent roll press was an inverted trapezoid as shown at FIG. 4(b), and the speed at which sheet-like metal foil S was taken up was not less than 20 m per minute, at which time the tension applied to sheet-like metal foil S was on the order of 10 N to 60 N. In particular, satisfactory results were obtained when tension was on the order of 20 N to 30 N. Conversely, it was found that wrinkling occurred in the longitudinal direction (travel direction of the electrode sheet) when tension exceeded 60 N.

In addition, it was found when electrode sheet for which curl magnitude was at least reduced to 2.5 mm or less was made available to the winding machine in the subsequent operation that rupture strength and tensile strength of the electrode sheet were both unchanged as compared with electrode sheet which had not been subjected to working by drawing. Furthermore, there was improvement in the situation with respect to skewed winding at the winding machine.

Based on the foregoing test results, to achieve a curl magnitude of zero, it was learned that linear load at the press, i.e., linear load at the intermittent roll press during creation of drawn regions (step S3), must be at least 30% or more of the linear load at the main roll press during working by rolling (step S4).

If the pitch between adjacent compression regions at the intermittent roll press is too small, it will be impossible to suppress meandering of the electrode sheet; on the other hand, if the pitch therebetween is too large, wrinkling will occur, and there will also be curling due to inability to correct meander. During testing carried out with a prototype, satisfactory results were obtained when pitch was within the range 15 mm to 50 mm, and particularly when pitch was on the order of 30 mm.

By thus compressing uncoated region(s) to create drawn regions while appropriate tension is applied to the electrode sheet through use of a tension-controlled press system, elongation in the latitudinal direction (width direction of metal foil S) being suppressed, it is possible to cause only the longitudinal direction to be subjected to working by drawing. It is thought that this may be the reason that suppression of deformation at edge surface(s) is permitted.

Note that where it is said herein that active material layer is subjected to working by rolling at the entire surface except for at least one edge portion of the electrode sheet, this means that active material layer is subjected to working by rolling over more or less the entire surface thereof, it having been confirmed that similar effect may be achieved by the present invention despite formation of extremely small voids (portions of the surface that are not coated with active material) within the active material layer, and despite employment of an electrode for which the cross-section of the active material layer edge surface has a thickness that tapers over a width on the order of 1 mm.

DRAWINGS

FIG. 1
FIG. 2
(a)
(b)
FIG. 3
FIG. 4
FIG. 5
S1 Coat with active material
S2 Create uncoated region S3 Subject to working by intermittent roll press (create compressed locations)
S4 Subject active material layer to working by rolling
 FIG. 6
 FIG. 7
 FIG. 8
Y Curl magnitude [mm]
X Nip pressure [kgf/cm$^2$]
 FIG. 9

What is claimed is:

1. An electrode sheet comprising:
  a sheet of metal foil;
  at least one region coated with at least one active material layer subjected to working by rolling, the at least one coated region being provided in at least one central portion of the sheet of metal foil;
  at least one region uncoated with the at least one active material layer, the at least one uncoated region being provided in at least one edge portion of the sheet of metal foil; and
  at least one region subjected to working by drawing, the at least one drawn region being provided in at least a portion of the at least one uncoated region,
  wherein there are a plurality of the drawn regions, the plurality of the drawn regions being provided in intermittent fashion in a long direction of the electrode sheet.

2. An electrode sheet according to claim 1, wherein the at least one drawn region is rectangular in shape.

3. An electrode sheet according to claim 2, wherein the at least one rectangular drawn region has at least one rounded corner.

4. An electrode sheet according to claim 1, wherein the electrode sheet is nonporous.

5. An electrode sheet according to claim 4, wherein a substrate material of the electrode sheet comprises is at least one member selected from among the group consisting of aluminum, copper, and metal-coated resin film.

6. An electrode sheet comprising:
  a sheet of metal foil;
  at least one region coated with at least one active material layer subjected to working by rolling, the at least one coated region being provided in at least one central portion of the sheet of metal foil;
  at least one region uncoated with the at least one active material layer, the at least one uncoated region being provided in at least one edge portion of the sheet of metal foil;
  at least one region subjected to working by drawing, the at least one drawn region being provided in at least a portion of the at least one uncoated region; and
  at least one uncompressed region at which the at least one drawn region is not created,
  wherein the at least one uncompressed region is provided between the at least one drawn region and the at least one coated region.

7. An electrode sheet comprising:
  a sheet of metal foil;
  at least one region coated with at least one active material layer subjected to working by rolling, the at least one coated region being provided in at least one central portion of the sheet of metal foil;
  at least one region uncoated with the at least one active material layer, the at least one uncoated region being provided in at least one edge portion of the sheet of metal foil; and
  at least one region subjected to working by drawing, the at least one drawn region being provided in at least a portion of the at least one uncoated region,
  wherein the at least one drawn region is provided at only one side of the electrode sheet.

8. An electrode sheet comprising:
  a metal thin film;
  a coated region which is coated with an active material layer subjected to working by rolling, the coated region being provided in a central portion of the metal thin film;
  an uncoated region which is not coated with the active material layer, the uncoated region being provided in an edge portion of the metal thin film; and
  a drawn region which is subjected to working by drawing, the drawn region being provided in at least a portion of the uncoated region,
  wherein the drawn region comprises a plurality of drawn regions, the plurality of the drawn regions being provided in intermittent fashion in a lengthwise direction of the metal thin film.

9. An electrode sheet according to claim 8, wherein the drawn region comprises a rectangular shape.

10. An electrode sheet according to claim 9, wherein the drawn region comprises a rounded corner.

11. An electrode sheet comprising:
  a metal thin film;
  a coated region which is coated with an active material layer subjected to working by rolling, the coated region being provided in a central portion of the metal thin film;
  an uncoated region which is not coated with the active material layer, the uncoated region being provided in an edge portion of the metal thin film;
  a drawn region which is subjected to working by drawing, the drawn region being provided in at least a portion of the uncoated region; and
  an uncompressed region at which the drawn region is not created,
  wherein the uncompressed region is provided between the drawn region and the coated region.

12. An electrode sheet comprising:
  a metal thin film;
  a coated region which is coated with an active material layer subjected to working by rolling, the coated region being provided in a central portion of the metal thin film;
  an uncoated region which is not coated with the active material layer, the uncoated region being provided in an edge portion of the metal thin film; and
  a drawn region which is subjected to working by drawing, the drawn region being provided in at least a portion of the uncoated region,
  wherein the drawn region is provided at only one side of the metal thin film.

13. An electrode sheet manufacturing method, the method comprising:
  preparing an electrode sheet having
    at least one region coated with at least one active material layer, the at least one coated region being created in at least one central portion of the electrode sheet, and
    at least one region uncoated with the at least one active material, the uncoated region being created in at least one edge portion of the electrode sheet;
  subjecting a portion of the at least one uncoated region to working by a press so as to create at least one drawn region; and
  subjecting the at least one coated region to working by rolling.

14. An electrode sheet manufacturing method according to claim 13, wherein the creation and the working by rolling of the at least one coated region is carried out before the creation of the at least one drawn region.

15. An electrode sheet manufacturing method according to claim 14, further comprising:
   takeup of the electrode sheet;
   wherein the takeup of the electrode sheet is carried out after the creation and the working by rolling of the at least one coated region but before the creation of the at least one drawn region.

16. An electrode sheet manufacturing method according to claim 13, wherein a linear load during the creation of the at least one drawn region is not less than 30% of a linear load during the creation and the working by rolling of the at least one coated region.

17. An electrode sheet manufacturing method according to claim 16, wherein a tension applied during the creation of the at least one drawn region is not less than 10 N and not more than 60 N.

* * * * *